US009438837B2

(12) United States Patent
Ono (10) Patent No.: US 9,438,837 B2
(45) Date of Patent: Sep. 6, 2016

(54) IMAGE SENSOR AND IMAGE SENSING SYSTEM WITH REDUNDANT DATA (71) Applicant: CANON KABUSHIKI KAISHA, Tokyo (JP)

(72) Inventor: Toshiaki Ono, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/516,894

(22) Filed: Oct. 17, 2014

(65) Prior Publication Data

US 2015/0138415 A1 May 21, 2015

(30) Foreign Application Priority Data

Nov. 20, 2013 (JP) ................................. 2013-240256

(51) Int. Cl.
*H04N 5/374* (2011.01)
*H04N 5/378* (2011.01)
*H04N 5/3745* (2011.01)

(52) U.S. Cl.
CPC .......... *H04N 5/37455* (2013.01); *H04N 5/378* (2013.01)

(58) Field of Classification Search
CPC ... H04N 5/37455; H04N 5/378; H04N 5/367
USPC ........................................................ 348/302
See application file for complete search history.

(56) References Cited

U.S. PATENT DOCUMENTS

| 7,787,037 | B2 | 8/2010 | Ono et al. | |
|---|---|---|---|---|
| 7,817,199 | B2 | 10/2010 | Yamashita et al. | |
| 7,986,353 | B2 | 7/2011 | Ono | |
| 8,085,319 | B2 | 12/2011 | Ono et al. | |
| 8,618,461 | B2 | 12/2013 | Doi | |
| 8,670,049 | B2 | 3/2014 | Ono et al. | |
| 8,675,107 | B2 | 3/2014 | Yamashita et al. | |
| 8,810,705 | B2 | 8/2014 | Ono | |
| 8,860,858 | B2 | 10/2014 | Ono | |
| 2007/0279499 | A1* | 12/2007 | Takeshita ............. | H04N 1/2112 348/231.6 |
| 2009/0164741 | A1* | 6/2009 | Takaki ................ | G06F 17/3028 711/158 |
| 2010/0023837 | A1* | 1/2010 | Nakagawa ............ | H03M 13/35 714/752 |
| 2012/0120287 | A1* | 5/2012 | Funamoto ............. | H04N 5/335 348/246 |
| 2013/0161488 | A1* | 6/2013 | Doi ........................ | H04N 5/378 250/208.1 |
| 2013/0181115 | A1 | 7/2013 | Ono | |

(Continued)

FOREIGN PATENT DOCUMENTS

JP 2012-060334 A 3/2012

OTHER PUBLICATIONS

U.S. Appl. No. 14/470,141, filed Aug. 27, 2014, Hideaki Takada et al.

(Continued)

*Primary Examiner* — Gevell Selby
(74) *Attorney, Agent, or Firm* — Fitzpatrick, Cella, Harper & Scinto (57) ABSTRACT

An image sensor including a pixel unit in which a plurality of pixels are arranged in a matrix, an A/D conversion circuit provided corresponding to each column of the matrix and configured to A/D-convert a pixel signal output from the pixel unit and output digital data corresponding to the pixel signal, a memory provided on each column, and a redundant data generation unit configured to generate redundant data based on a generating rule of an error correction code for the digital data, wherein the digital data and the redundant data are stored in the memory.

12 Claims, 8 Drawing Sheets

(56) References Cited

U.S. PATENT DOCUMENTS

| | | |
|---|---|---|
| 2013/0182157 A1 | 7/2013 | Ono |
| 2013/0182163 A1 | 7/2013 | Kobayashi et al. |
| 2014/0375859 A1 | 12/2014 | Ono et al. |
| 2015/0009385 A1 | 1/2015 | Tsukida et al. |

OTHER PUBLICATIONS

Takada et al., U.S. Appl. No. 14/470,141, filed Aug. 27, 2014.

* cited by examiner

| ERROR BIT POSITION | R1 | R2 | R3 | R4 |
|---|---|---|---|---|
| cnt[0] | 1 | 0 | 0 | 1 |
| cnt[1] | 1 | 1 | 0 | 1 |
| cnt[2] | 1 | 1 | 1 | 1 |
| cnt[3] | 1 | 1 | 1 | 0 |
| cnt[4] | 0 | 1 | 1 | 1 |
| cnt[5] | 1 | 0 | 1 | 0 |
| cnt[6] | 0 | 1 | 0 | 1 |
| cnt[7] | 1 | 0 | 1 | 1 |
| cnt[8] | 1 | 1 | 0 | 0 |
| cnt[9] | 0 | 1 | 1 | 0 |
| cnt[10] | 0 | 0 | 1 | 1 |
| cnt[11] | 1 | 0 | 0 | 0 |
| cnt[12] | 0 | 1 | 0 | 0 |
| cnt[13] | 0 | 0 | 1 | 0 |
| cnt[14] | 0 | 0 | 0 | 1 |
| NO ERROR | 0 | 0 | 0 | 0 |

| ERROR BIT POSITION | R1 | R2 | R3 |
|---|---|---|---|
| a[0] | 1 | 0 | 1 |
| a[1] | 1 | 1 | 1 |
| a[2] | 1 | 1 | 0 |
| a[3] | 0 | 1 | 1 |
| b[0] | 1 | 0 | 0 |
| b[1] | 0 | 1 | 0 |
| b[2] | 0 | 0 | 1 |
| NO ERROR | 0 | 0 | 0 |

IMAGE SENSOR AND IMAGE SENSING SYSTEM WITH REDUNDANT DATA

BACKGROUND OF THE INVENTION

1. Field of the Invention

The present invention relates to an image sensor incorporating an A/D conversion circuit, and an image sensing system.

2. Description of the Related Art

Japanese Patent Laid-Open No. 2012-060334 discloses a technique of saving an error when a defect bit is generated in a data holding unit in a CMOS image sensor incorporating an A/D conversion circuit.

In the above patent literature, however, to specify the defect bit in the data holding unit, special driving of the data holding unit is executed at a timing other than a normal image sensing timing. That is, an operation for examination is required.

Even if a normal state is determined when executing driving for specifying the defect bit, if a defect bit is generated after that, the defect bit cannot be saved. For example, if information of a defect bit is acquired by executing driving for specifying the defect bit only upon shipping from a factory, when a new defect bit is generated due to age deterioration or electrical/physical damage after shipping, an error cannot be saved. Alternatively, if information about a defect bit is acquired by executing driving for specifying the defect bit at a given timing, for example, upon power-on, when a defect bit dependent on the temperature is generated during normal image sensing, an error cannot be saved. Also, when a defect bit is suddenly generated only at a given timing like a software error, the error cannot be saved. The present invention has as its object to provide an image sensor that can specify a defect bit in data and recover an error even if the defect bit is suddenly generated in the data in the image sensor during image sensing.

SUMMARY OF THE INVENTION

The first aspect of the present invention provides an image sensor comprising a pixel unit in which a plurality of pixels are arranged in a matrix, an A/D conversion circuit provided corresponding to each column of the matrix and configured to A/D-convert a pixel signal output from the pixel unit and output digital data corresponding to the pixel signal, a memory provided on each column, and a redundant data generation unit configured to generate redundant data based on a generating rule of an error correction code for the digital data, wherein the digital data and the redundant data are stored in the memory.

Further features of the present invention will become apparent from the following description of exemplary embodiments (with reference to the attached drawings).

DESCRIPTION OF THE EMBODIMENTS (First Embodiment)

Figure 1:
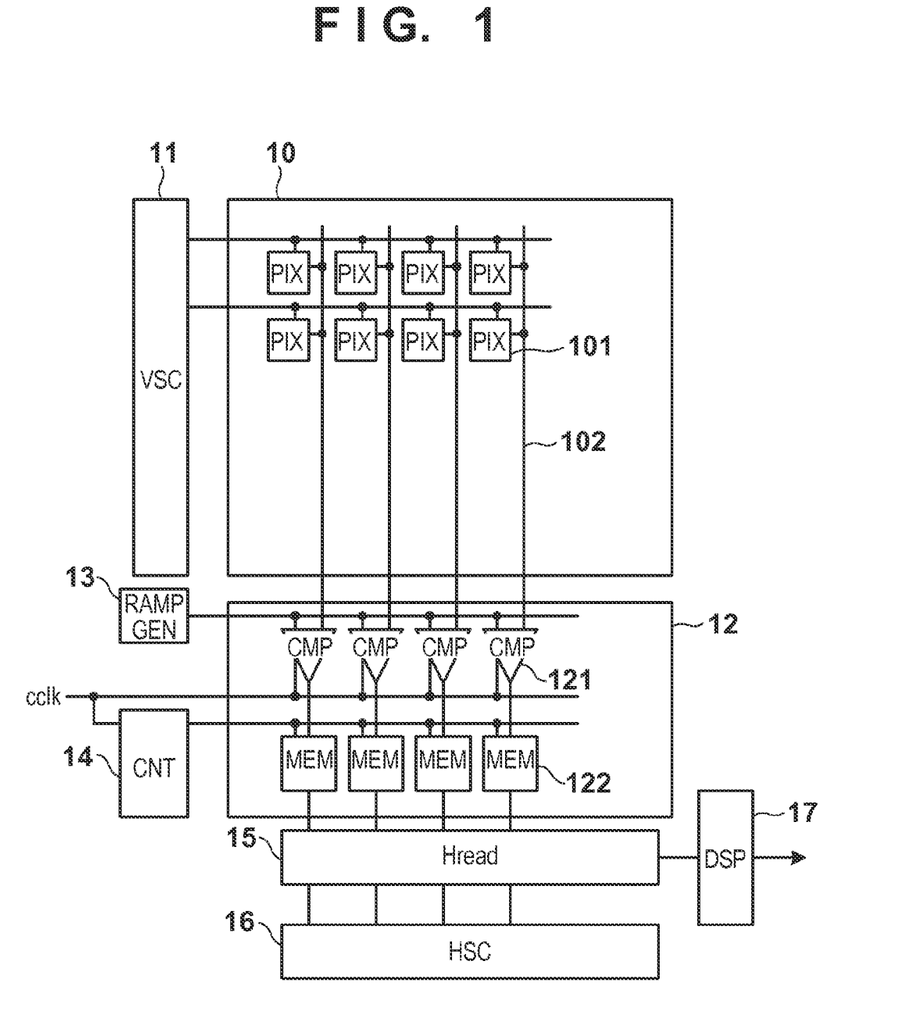
FIG. 1 is a circuit diagram showing the arrangement of an image sensor according to the first embodiment.

The first embodiment of the present invention will be described with reference to FIGS. 1 to 3. FIG. 1 shows an example of the arrangement of an image sensor. The image sensor includes a pixel unit 10 in which a plurality of pixels are arranged in a matrix, a vertical scanning circuit 11, a column A/D conversion circuit 12, a ramp signal generator 13, a count signal generator 14, a horizontal readout circuit 15, a horizontal scanning circuit 16, and a digital signal processing unit 17. The column A/D conversion circuit 12 includes comparators 121 and memories 122. An analog signal read out from each of pixels 101 on a row selected by the vertical scanning circuit 11 is input to one input of a corresponding one of the comparators 121 via a corresponding column output line 102, and a reference signal is supplied to the other input of the comparator. The reference signal is a ramp signal which has been output from the ramp signal generator 13 and rises with a given slope. In this embodiment, assume that when the value of the ramp signal exceeds the value of the analog signal, the output of the comparator is inverted.

The count signal generator 14 includes a binary up counter 141 which is supplied with a reference clock cclk to operate as a counter circuit. The binary up counter 141 counts the reference clock cclk in synchronism with the start of a change in ramp signal with time, and supplies the counted value as a count signal to the memories 122. When the output of the comparator 121 is inverted, the corresponding memory 122 reads the count signal generated by the binary up counter 141, and holds the count signal as digital data corresponding to a pixel signal. The same reference clock cclk as that supplied to the count signal generator 14 is supplied to each comparator 121. It is configured so that the inversion timing of the output of the comparator 121 is synchronized with the transit timing of the count signal. Under the control of the horizontal scanning circuit 16, the horizontal readout circuit 15 reads out the data held in the memory 122 on each column, and transfers the readout data to the digital signal processing unit 17. The digital signal processing unit 17 performs calculation processing for the transferred data, and outputs the resultant data to the outside of the image sensor.

Figure 2:
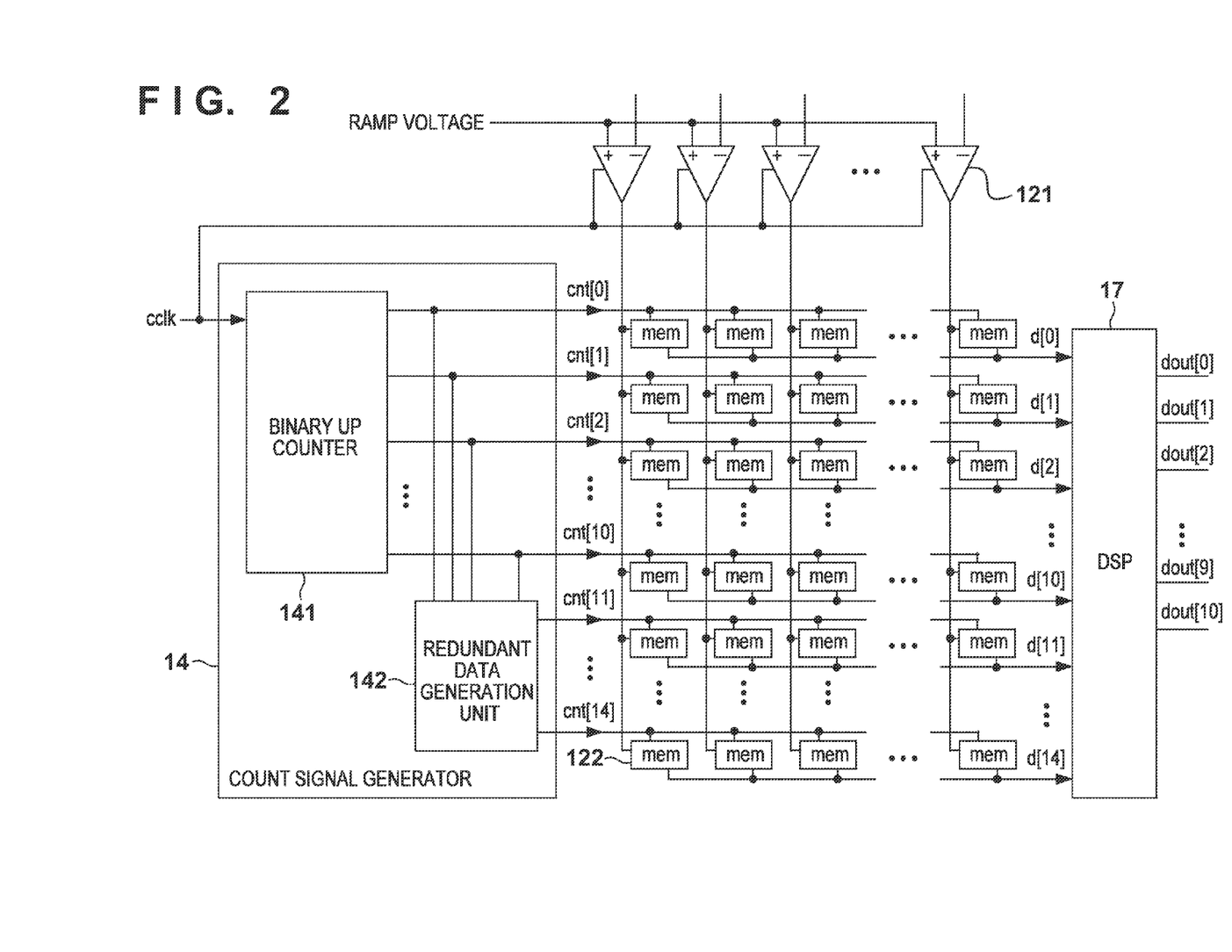
FIG. 2 is a circuit diagram showing the arrangement of a column A/D conversion circuit according to the first embodiment.
Figure 3:
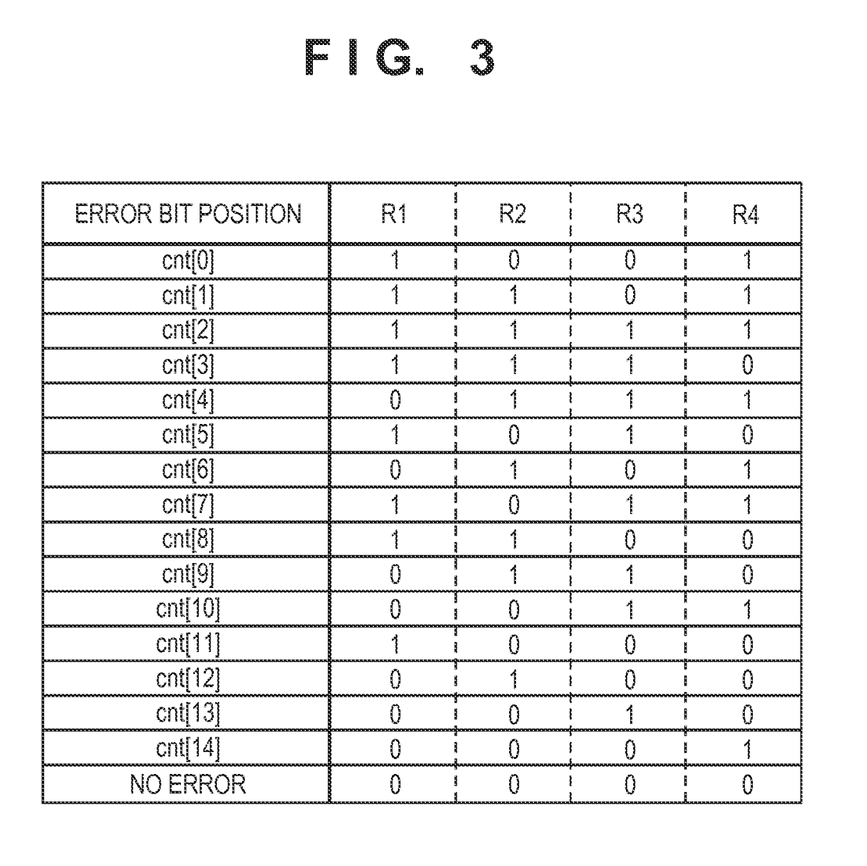
FIG. 3 is a table showing the correspondence between values and an error bit position according to decoding of the BCH(15, 11) code.

FIG. 2 shows, in detail, an example of the arrangement of the column A/D conversion circuit 12. The count signal generator 14 includes a redundant data generation unit 142 for generating redundant data so as to detect a defect bit in each memory, and correct an error. The redundant data is data generated based on an error correction code generating rule with respect to the count signal as a valid data output from the binary up counter 141. In this embodiment, M represents the number of bits of the valid data of the count signal output from the binary up counter 141, and N represents the total number of bits obtained by adding the number of bits of the redundant data (N>M). Therefore, the count signal generator 14 outputs N-bit data. The memory 122 is provided on each column, and configured to store N-bit data in total including the valid data and redundant data. The horizontal readout circuit 15 reads out the N-bit data from the memory 122, and transfers the data to the digital signal processing unit 17. The digital signal processing unit 17 detects based on the transferred data whether an error has occurred in the data according to an error correction code decoding rule. If an error has occurred, the digital signal processing unit 17 corrects the error, and outputs the M-bit valid data to the outside of the image sensor. Note that instead of performing error detection and error correction in the image sensor, error detection and error correction may be performed by a signal processing unit outside the image sensor by outputting the values of the valid data and redundant data to the outside of the image sensor. In this case, however, it is necessary to output N bit signals to the outside of the image sensor. Since N>M, it is more advantageous to output the valid data after performing error correction in the image sensor because the number of output bits decreases.

In this embodiment, a case in which the BCH(15, 11) code is applied as an error correction code will be described. The BCH(15, 11) code represents that the code is consisted of 15 bit signals in total by adding 4-bit redundant data to 11-bit valid data. The BCH(15, 11) code is a code that can correct an error when only one error bit exists in 15-bit data. In this embodiment, assume that data cnt[10:0] consisted of 11 output data bits cnt[0] to cnt[10] from the binary up counter 141 is 11-bit valid data. Based on the data cnt[10:0], the redundant data generation unit 142 generates data cnt[14:11] consisted of 4 redundant data bits cnt[11] to cnt[14] according to the generating rule of the BCH(15, 11) code.

The generating rule of the BCH(15, 11) code is represented by:

cnt[11]=cnt[0] XOR cnt[1] XOR cnt[2] XOR cnt[3] XOR cnt[5] XOR cnt[7] XOR cnt[8]

cnt[12]=cnt[1] XOR cnt[2] XOR cnt[3] XOR cnt[4] XOR cnt[6] XOR cnt[8] XOR cnt[9]

cnt[13]=cnt[2] XOR cnt[3] XOR cnt[4] XOR cnt[5] XOR cnt[7] XOR cnt[9] XOR cnt[10]

cnt[14]=cnt[0] XOR cnt[1] XOR cnt[2] XOR cnt[4] XOR cnt[6] XOR cnt[7] XOR cnt[10]

where cnt[11] to cnt[14] represent positions and values of bits in the BCH(15, 11) code, and XOR is an operator representing an exclusive OR operation.

The 4-bit redundant data cnt[14:11] obtained by the above equations is added to the 11-bit valid data cnt[10:0] from the count signal generator 14, and the count signal generator 14 outputs 15-bit data in total. In this embodiment, therefore, the memory 122 is provided to hold 15-bit data on each column. The memory 122 can hold both the valid data cnt[10:0] and the redundant data cnt[14:11] on each column.

Horizontal data lines for reading out data from the memory are provided for 15-bits of data d[14:0]. The horizontal readout circuit transfers the data read out from the memory to the horizontal data lines. The digital signal processing unit 17 receives both the valid data and the redundant data. Based on the decoding rule of the BCH(15, 11) code, the digital signal processing unit 17 determines whether an error has occurred in the input 15-bit data. If an error has occurred, the digital signal processing unit 17 corrects the data. The decoding rule of the BCH(15, 11) code is as follows. Based on the value of the input 15-bit data d[14:0], the digital signal processing unit 17 obtains R1 to R4 given by R1=d[0] XOR d[1] XOR d[2] XOR d[3] XOR d[5] XOR d[7] XOR d[8] XOR d[11]

R2=d[1] XOR d[2] XOR d[3] XOR d[4] XOR d[6] XOR d[8] XOR d[9] XOR d[12]

R3=d[2] XOR d[3] XOR d[4] XOR d[5] XOR d[7] XOR d[9] XOR d[10] XOR d[13]

R4=d[0] XOR d[1] XOR d[2] XOR d[4] XOR d[6] XOR d[7] XOR d[10] XOR d[14]

If the data d[14:0] is data according to the generating rule of the BCH(15, 11) code, R1=R2=R3=R4=0 always holds as long as no error has occurred in the data. That is, when the data d[14:0] without any error is input to the digital signal processing unit 17, R1=R2=R3=R4=0 holds.

If a defect bit is generated along an output path from the memory 122 to the digital signal processing unit 17 (that is, in the memory 122 and a data transfer path), the data d[14:0] is data not complying with the generating rule of the BCH(15, 11) code. That is, one of the values R1 to R4 becomes 1. Depending on which of the values R1 to R4 is 1, it is possible to specify an error bit in the data d[14:0]. FIG. 3 shows the correspondence between the values R1 to R4 obtained by the above equations and the position of an error bit. Since each bit of the data d[14:0] is binary data (0 or 1), if the position of the error bit is specified, correct data is obtained by only inverting the bit. As described above, the digital signal processing unit 17 can determine whether the input data d[14:0] is correct data. Also, if an error has occurred, the digital signal processing unit 17 can correct the error data to correct data.

The digital signal processing unit 17 decodes the data d[14:0]. If the data d[14:0] is correct, the digital signal processing unit 17 outputs, as data dout[10:0], the data d[10:0] as the valid data intact. If an error has occurred in the data d[14:0], the digital signal processing unit 17 corrects the error data to correct data, thereby outputting the data as data dout[10:0]. Note that when the BCH(15, 11) code is used, it is possible to correct up to one error bit in 15-bit data. Therefore, if there is only one defect bit in 15-bit data on each column which has been input to the digital signal processing unit 17, it is possible to save the defect bit. If there are a plurality of defect bits over a plurality of columns, it is possible to save the defect bits as long as a condition that the number of defect bits in 15-bit data on each column is one or less is satisfied. That is, if there is one defect bit in the 15-bit data on a given column and one defect bit in the 15-bit data on another column, it is possible to save the defect bits. As long as this condition is satisfied, even a defect bit generated in the memory, a defect bit generated at the time of transfer from the horizontal readout circuit, or defect bits generated in the memory and at the time of transfer can be saved. When the BCH(15, 11) code is used, it is possible to correct an error as long as the condition that the number of defect bits in 15-bit data on each column is one or less is satisfied.

As described above, in this embodiment, it is possible to perform the error detection/correction sequence every time image sensing is performed and data is read out into the digital signal processing unit 17. Since the count signal generator 14 always outputs data cnt[14:0] obtained by adding the redundant data to the valid data, when the memory 122 loads and holds digital data corresponding to an image signal, it can hold the data including the redundant data. Therefore, the digital signal processing unit 17 can perform error correction based on the data d[14:0] every time the data d[14:0] is input.

In this embodiment, error correction is always performed for an output obtained by image sensing. This eliminates the need to execute a special operation for examining a defect bit. An additional time is not required for examination. Even if a defect bit is suddenly generated during image sensing, or a defect bit is generated after examination, it is possible to save the defect bit.

Note that a case in which the BCH(15, 11) code is applied has been explained in this embodiment. The BCH(15, 11) code is a code that is consisted of 11-bit valid data and 4-bit redundant data, that is, 15 bits in total, and can correct one error bit in 15-bit data. There are many other kinds of BCH codes such as the BCH(31, 26) code, BCH(15, 7) code, and BCH(31, 21) code. The BCH(31, 26) code is a code that is consisted of 26-bit valid data and 5-bit redundant data, that is, 31 bits in total, and can correct one error bit in 31-bit data. The BCH(15, 7) code is a code that is consisted of 7-bit valid data and 8-bit redundant data, that is, 15 bits in total, and can correct up to two error bits in 15-bit data. The BCH(31, 21) code is a code that is consisted of 21-bit valid data and 10-bit redundant data, that is, 31 bits in total, and can correct up to two error bits in 31-bit data. The present invention is not limited to the BCH(15, 11) code, and it is possible to appropriately select the number of bits of valid data and the number of bits to be corrected, and use a code, as needed.

(Second Embodiment)

Figure 4:
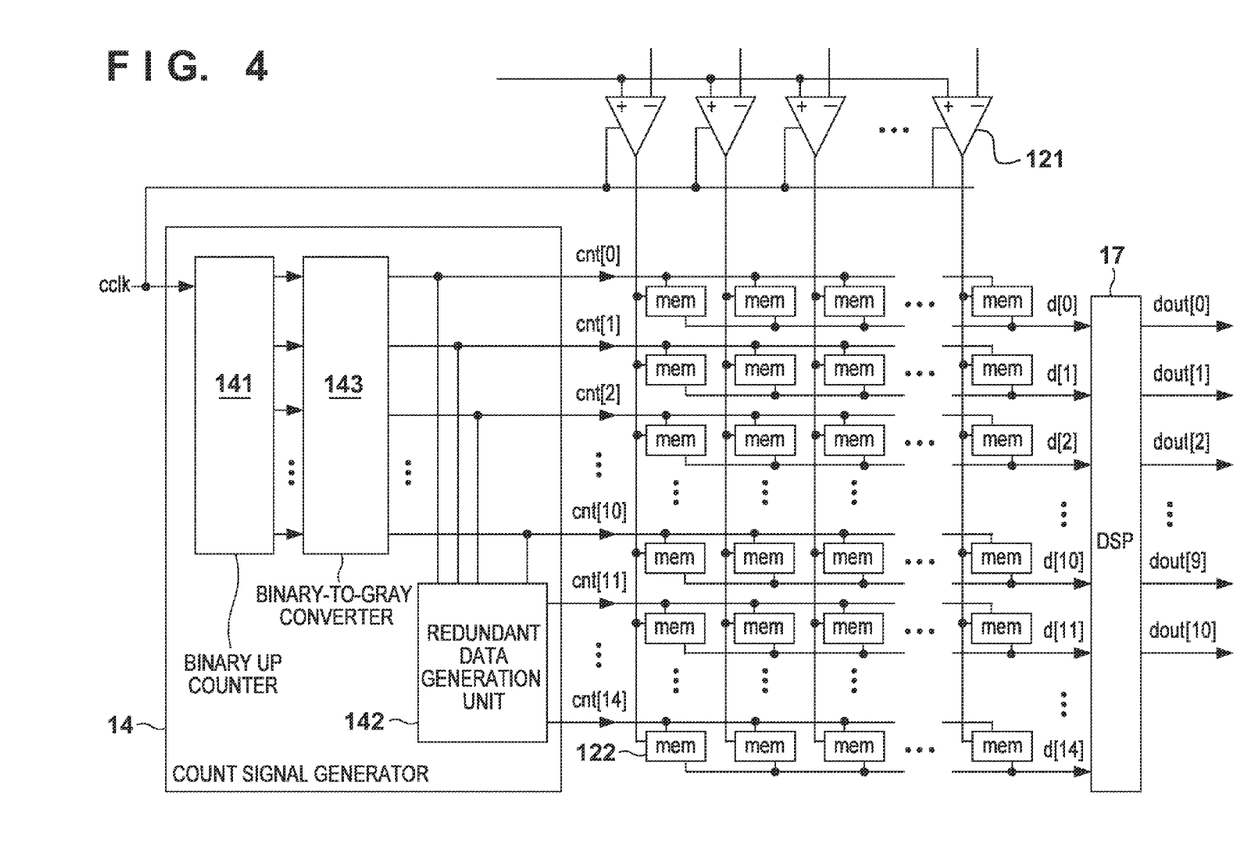
FIG. 4 is a circuit diagram showing the arrangement of a column A/D conversion circuit according to the second embodiment.

The second embodiment of the present invention will be described with reference to FIG. 4. A description of the same arrangement as that in the first embodiment will be omitted. In the first embodiment, the data cnt[10:0] as the valid data of the count signal output is a simple binary code. In this embodiment, however, valid data output from a count signal generator 14 is converted into a gray code, and then output. To do this, the count signal generator 14 includes a binary code -to-gray code converter 143. In the case of the use of a binary code, when a count signal is counted up by one, a number of bits may be inverted at the same time. The gray code has a feature that when counting up by one, only one bit is inverted without exception. Consequently, even if synchronization between the transit timing of a count signal and the inversion timing of a comparator is lost, and the count signal is loaded into a memory in a count signal transit state, its influence can be minimized.

To perform BCH(15, 11) encoding for valid data from a binary up counter 141, 4-bit redundant data cnt[14:11] corresponding to valid data cnt[10:0] converted into a gray code is generated, and added to the valid data. The arrangement of memories 122, data output from each memory 122, and the arrangement and operation of the digital signal processing unit 17 are the same as those in the first embodiment. In this embodiment, since valid data d[10:0] of data d[14:0] input to a digital signal processing unit 17 is a gray code, if no processing is performed, data dout[10:0] output from the digital signal processing unit 17 is also a gray code. If it is desired to convert the data into a general binary code, and output it, a converter for converting a gray code into a binary code may be added to the digital signal processing unit 17.

(Third Embodiment)

Figure 5:
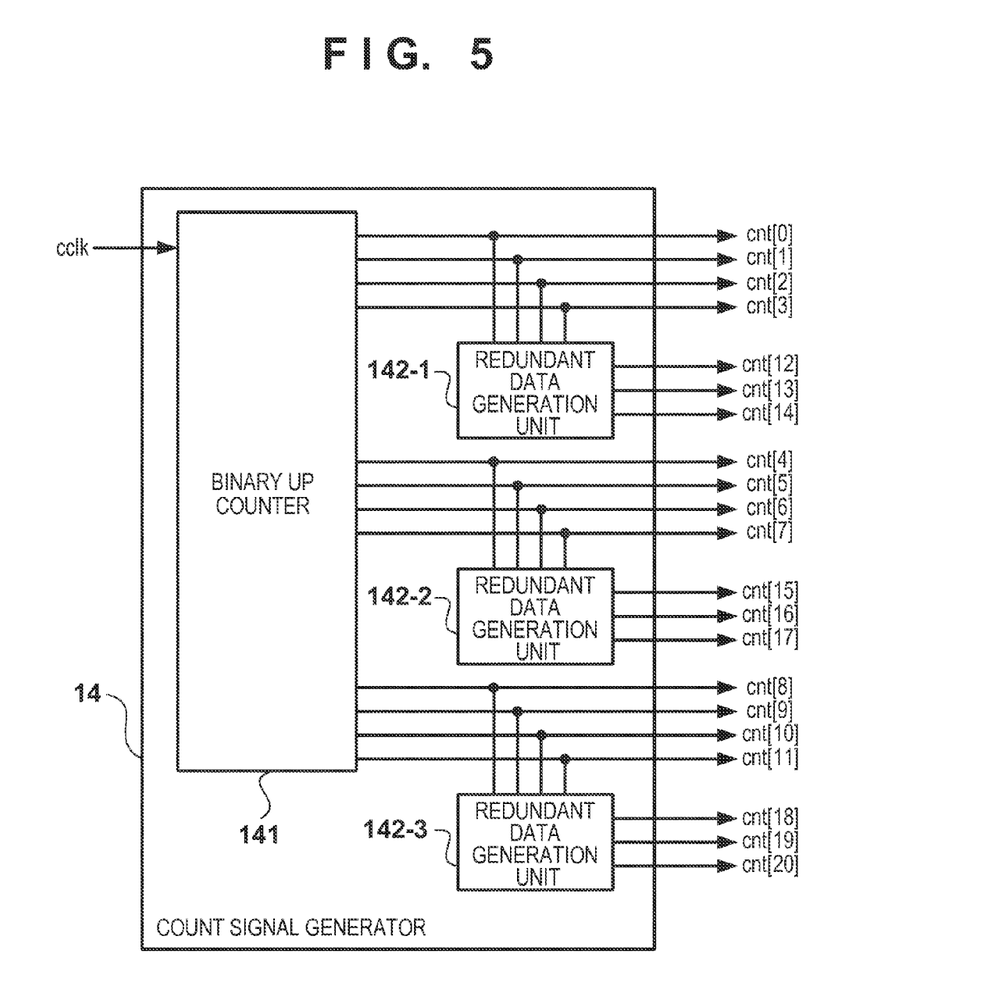
FIG. 5 is block diagram showing the arrangement of a count signal generator according to the third embodiment.

The third embodiment of the present invention will be described with reference to FIGS. 5 and 6. The arrangement other than a count signal generator 14 is the same as that in the first embodiment. In this embodiment, a case in which when the valid data of a count signal has 12 bits, the Hamming(7, 4) code is used as an error correction code will be explained. The Hamming(7, 4) code is 7-bit data obtained by adding 3-bit redundant data to 4-bit valid data, and a code that can correct one error bit in 7-bit data. When 4 valid data bits a[0] to a[3] are set as data a[3:0] and 3 redundant data bits b[0] to b[2] are set as data b[2:0], a code generating rule is represented by b[0]=a[0] XOR a[1] XOR a[2]
b[1]=a[1] XOR a[2] XOR a[3]
b[2]=a[0] XOR a[1] XOR a[3]

A decoding rule is represented by

R1=a[0] XOR a[1] XOR a[2] XOR b[0]
R2=a[1] XOR a[2] XOR a[3] XOR b[1]
R3=a[0] XOR a[1] XOR a[3] XOR b[2]

Figure 6:
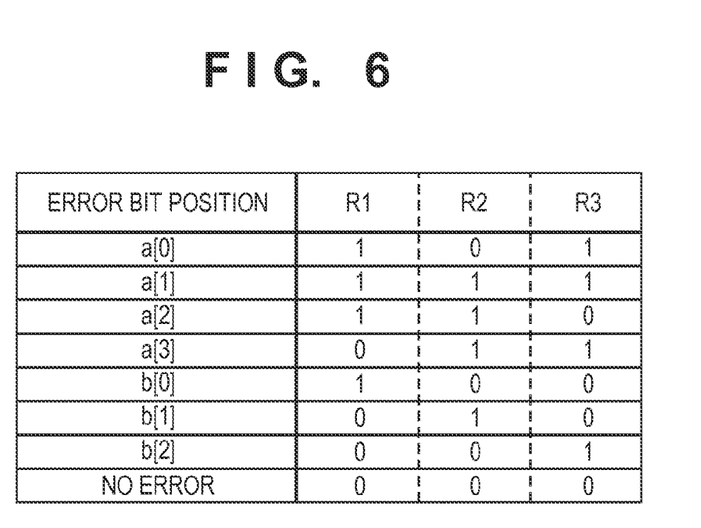
FIG. 6 is a table showing the correspondence between values and an error bit position according to decoding of the Hamming(7, 4) code.

FIG. 6 shows the correspondence between the position of an error bit and the values R1 to R3 obtained according to the above equations. When the length of the valid data of the count signal is 12 bits, the data is divided into three blocks each having 4 bits, and the rule of the Hamming(7, 4) code is applied to each block (4 bits). More specifically, as shown in FIG. 5, valid data cnt[11:0] is divided into three blocks cnt[11:8], cnt[7:4], and cnt[3:0]. Redundant data generation units 142-1 to 142-3 are provided in correspondence with the respective blocks. Based on the 4-bit data cnt[3:0], 3-bit redundant data cnt[14:12] is generated. Based on the 4-bit data cnt[7:4], 3-bit redundant data cnt[17:15] is generated. Based on the 4-bit data cnt[11:8], 3-bit redundant data cnt[20:18] is generated. A count signal generator 14 outputs 21-bit data cnt[20:0] in total including the 12-bit valid data and 9-bit redundant data. As in the first embodiment, the data cnt[20:0] is read out by a 21-bit memory 122 provided on each column when the output of a corresponding comparator 121 is inverted. Under the control of a horizontal scanning circuit 16, the data d[20:0] from the memory is transferred to a digital signal processing unit 17.

The digital signal processing unit 17 decodes 7-bit data in total including the data d[3:0] and the data d[14:12] read out from the memory, thereby generating 4-bit valid data dout [3:0]. Similarly, the digital signal processing unit 17 decodes 7-bit data in total including the data d[7:4] and the data d[17:15], thereby generating 4-bit valid data dout[7:4]. Furthermore, the digital signal processing unit 17 decodes 7-bit data in total including the data d[11:8] and the data d[20:18], thereby generating 4-bit valid data dout[11:8]. As a result, the 12-bit valid data dout[11:0] can be obtained as the output of the digital signal processing unit 17. The Hamming(7, 4) code is a code that can correct one error bit in 7-bit data. Therefore, even if one defect bit is generated in each of the 7-bit data of the data[3:0] and d[14:12], the data d[7:4] and d[17:15], and the data d[11:8] and d[20:18], it is possible to save the defect bits. That is, even if up to 3 defect bits are generated in the data, it is possible to save the defect bits.

(Fourth Embodiment)

Figure 7:
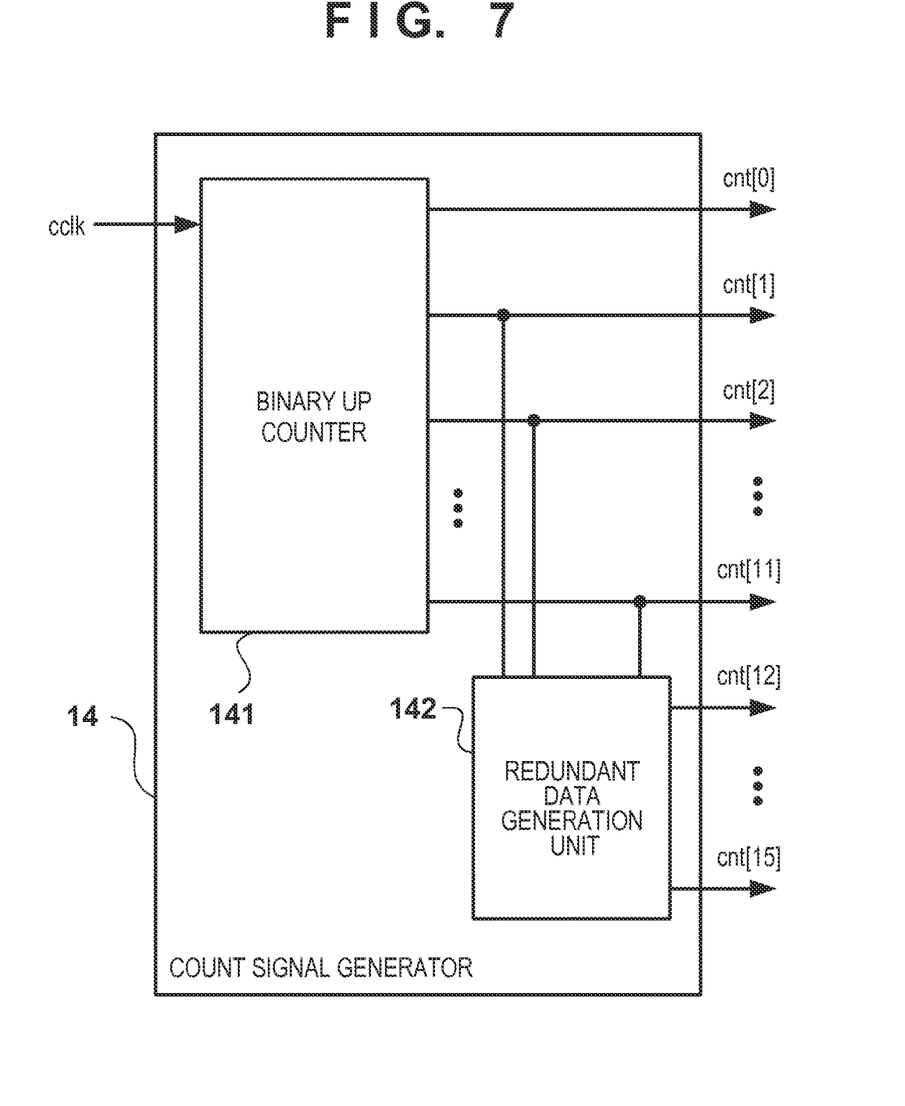
FIG. 7 is a block diagram showing the arrangement of a count signal generator according to the fourth embodiment.

The fourth embodiment of the present invention will be described with reference to FIG. 7. An arrangement other than a count signal generator 14 is the same as that in the first embodiment. In this embodiment, a case in which when the length of the valid data of a count signal is 12 bits, the BCH(15, 11) code is used as an error correction code will be explained. As described above, the BCH(15, 11) code represent that the code is consisted of 15-bit data in total by adding 4-bit redundant data to 11-bit valid data. Therefore, if the valid data of the count signal has 12 bits, 1 bit cannot be encoded. In this embodiment, as shown in FIG. 7, a redundant data generation unit 142 generates valid data for 11-bit data cnt[11:1], on the upper side, obtained by excluding a least significant bit cnt[0] from 12-bit valid data cnt[11:0], and adds the valid data. In this case, it is possible to perform error correction for one error bit in the 15-bit data cnt[15:1]. However, if an error has occurred at the bit cnt[0], the error cannot be corrected.

Since, however, the bit cnt[0] is the least significant bit (LSB), if the value is incorrect, its influence on an image is small. As described above, if the number of bits of the valid data of the count signal is larger than that of bits of the valid data of the error correction code to be applied, the number of bits of the valid data is suppressed by setting only bits on the upper side of the valid data as encoding targets, and excluding bits on the lower side from encoding targets. According to this embodiment, while an increase in number of bits is suppressed, deterioration in image is minimized.

(Fifth Embodiment)

Figure 8:
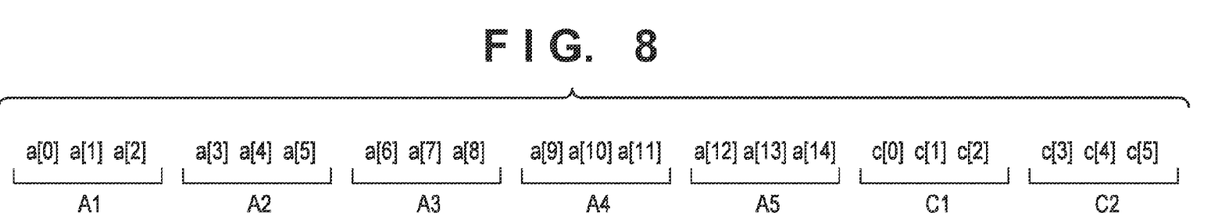
FIG. 8 is a schematic view showing an RS code according to the fifth embodiment.

The fifth embodiment of the present invention will be described with reference to FIG. 8. FIG. 8 is a view showing the concept of the RS(7, 5) code among Reed-Solomon (RS) codes. The RS(7, 5) code is a code for performing encoding and decoding for each byte set to include 3 bits. The RS(7, 5) code is a 7-byte code in total including 5-byte valid data and 2-byte redundant data, and is a code that can correct one error byte in 7-byte data. In other words, the RS(7, 5) code is a 21-bit code in total including 15-bit valid data and 6-bit redundant data, and is a code that can perform error correction even if up to three error bits exist but if the error bits exist in one byte. Therefore, the Reed-Solomon code is an effective code when defect bits intensively exist in neighboring bytes. More specifically, in this embodiment, as shown in FIG. 8, the count signal generator considers valid data a[14:0] as five data bytes A1 to A5. A redundant data generation unit 142 generates two redundant data bytes C1 and C2, and adds the redundant data to the valid data, thereby outputting the resultant data.

(Sixth Embodiment)

Figure 9:
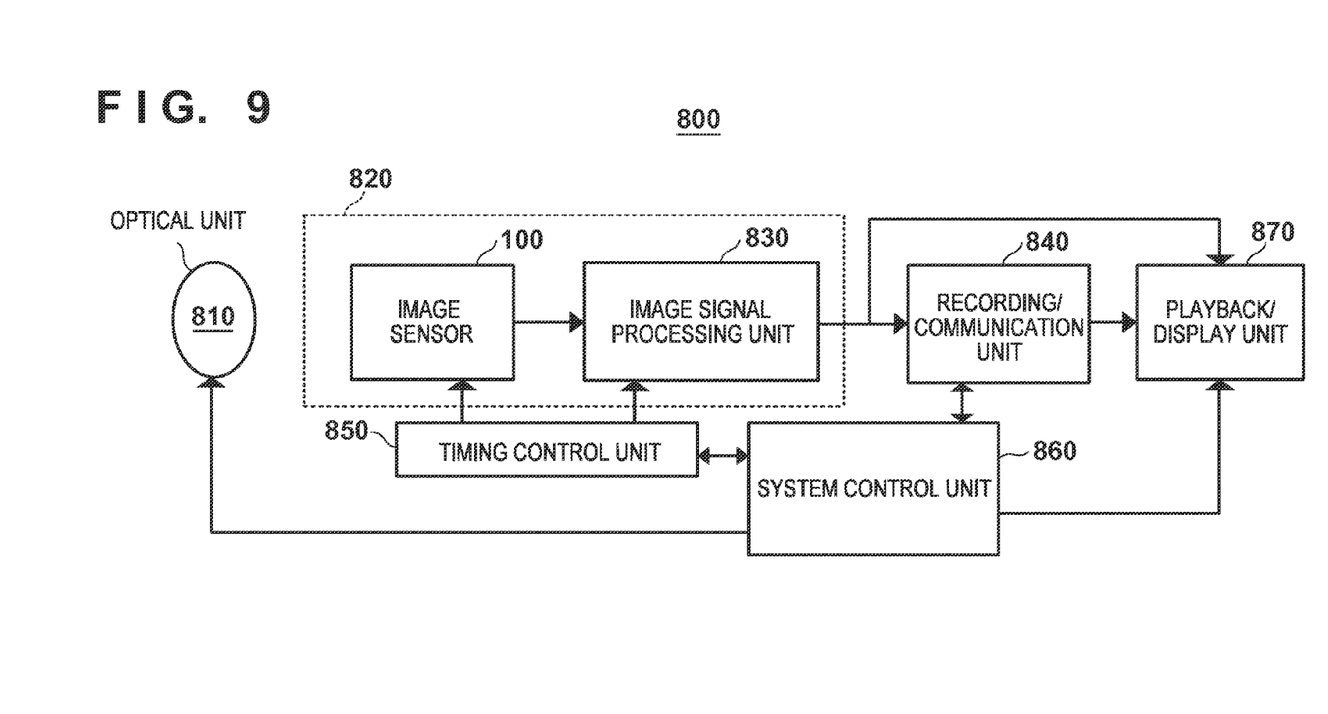
FIG. 9 is a block diagram showing the configuration of an image sensing system using an image sensor according to the present invention.

FIG. 9 is a block diagram showing an example of the configuration of an image sensing system according to the sixth embodiment of the present invention. An image sensing system 800 includes, for example, an optical unit 810, an image sensor 100, an image signal processing unit 830, a recording/communication unit 840, a timing control unit 850, a system control unit 860, and a playback/display unit 870. An image sensing unit 820 includes the image sensor 100 and the image signal processing unit 830. As the image sensor 100, the image sensor described in each of the above embodiments is used.

The optical unit 810 serving as an optical system such as a lens forms an image of light from an object on a pixel unit 10, in which a plurality of pixels are arranged in a matrix, of the image sensor 100, thereby forming an object image. The image sensor 100 outputs a signal corresponding to the image of the light formed on the pixel unit 10 at a timing based on a signal from the timing control unit 850. The signal output from the image sensor 100 is input to the image signal processing unit 830, which then performs signal processing according to a method defined by a program or the like. A signal obtained by the processing by the image signal processing unit 830 is sent to the recording/communication unit 840 as image data. The recording/communication unit 840 sends a signal for forming an image to the playback/display unit 870, thereby causing the playback/display unit 870 to play back and display a moving image or still image. Upon receiving the signal from the image signal processing unit 830, the recording/communication unit 840 communicates with the system control unit 860, and performs an operation of recording the signal for forming an image in a recording medium (not shown).

The system control unit 860 centrally controls the operation of the image sensing system, and controls driving of the optical unit 810, timing control unit 850, recording/communication unit 840, and playback/display unit 870. The system control unit 860 includes, for example, a storage device (not shown) serving as a recording medium in which a program and the like necessary to control the operation of the image sensing system are recorded. The system control unit 860 supplies, to the image sensing system, a signal to switch a driving mode in accordance with, for example, a user operation. Practical examples are a change of a row to be read out or reset, a change of the angle of view along with electronic zooming, and a shift of the angle of view along with electronic anti-vibration. The timing control unit 850 controls the driving timings of the image sensor 100 and image signal processing unit 830 under the control of the system control unit 860.

As described above, any kind of error correction codes may be used in the present invention. It is possible to select an appropriate code according to the number of bits of the valid data of a count signal, the number of defect bits to be corrected, whether it is highly probable that defect bits are stand-alone or intensively exist, a circuit scale necessary for encoding/decoding, the processing time, and the like. Although the A/D conversion circuit of the type for performing comparison with a ramp signal has been exemplified, the present invention is not limited to this. For example, the present invention can be implemented by providing a successive-approximation type A/D conversion circuit on each column, and generating and adding redundant data to valid data output from the A/D conversion circuit on each column. According to the present invention, even if a defect bit is suddenly generated in data within an image sensor during image sensing, it is possible to specify the defect bit in the data and recover the error.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No.2013-240256, filed, Nov. 20, 2013, which is hereby incorporated by reference herein in its entirety.

What is claimed is:

1. An image sensor comprising:
   a pixel unit in which a plurality of pixels are arranged in a matrix;
   an A/D conversion circuit provided corresponding to each column of the matrix and configured to A/D-convert a pixel signal output from the pixel unit and output digital data corresponding to the pixel signal, the A/D conversion circuit including a comparator configured to compare the signal from the pixel with a reference signal;
   a counter circuit configured to count a reference clock and generate a count signal;
   a redundant data generation unit configured to generate redundant data for correcting the digital data by encoding the count signal based on a generating rule of an error correction code; and
   a memory configured to store the count signal as the digital signal and the redundant data in accordance with an output signal from the comparator.

2. The sensor according to claim 1, wherein the digital data is a data expressed in a gray code, and the redundant data generation unit generates redundant data based on a generating rule of an error correction code for the gray code.

3. The sensor according to claim 1, wherein the digital data is divided into a plurality of blocks, and the redundant data generation unit generates redundant data for each of the plurality of blocks based on a generating rule of an error correction code.

4. The sensor according to claim 1, wherein the redundant data generation unit generates redundant data for only bits except for a least significant bit among a plurality of bits consisting the digital data.

5. The sensor according to claim 1, wherein the error correction code is a BCH code.

6. The sensor according to claim 1, wherein the error correction code is a Hamming code.

7. The sensor according to claim 1, wherein the error correction code is a Reed-Solomon code.

8. The sensor according to claim 1, wherein the comparator operates in synchronism with the reference clock.

9. The sensor according to claim 1, wherein the counter circuit outputs the count signal expressed in a gray code.

10. The sensor according to claim 1, further comprising a digital signal processing unit configured to process data stored in the memory,
wherein the digital signal processing unit performs error correction for the data based on a decoding rule of the error correction code.

11. The sensor according to claim 1, wherein the sensor outputs the digital data and the redundant data.

12. An image sensing system comprising:
an image sensor; and
an image signal processing unit configured to generate image data by processing an output signal from the image sensor,
wherein the image sensor comprises:
a pixel unit in which a plurality of pixels are arranged in a matrix;
an A/D conversion circuit provided corresponding to each column of the matrix and configured to A/D-convert a pixel signal output from the pixel unit and output digital data corresponding to the pixel signal, the A/D conversion circuit including a comparator configured to compare the signal from the pixel with a reference signal;
a counter circuit configured to count a reference clock and generate a count signal;
a redundant data generation unit configured to generate redundant data for correcting the digital data by encoding the count signal based on a generating rule of an error correction code; and
a memory configured to store the count signal as the digital signal and the redundant data in accordance with an output signal from the comparator.

* * * * *